(12) United States Patent
Zhou et al.

(10) Patent No.: US 10,325,357 B2
(45) Date of Patent: Jun. 18, 2019

(54) IMAGE PROCESSING METHOD AND APPARATUS

(71) Applicant: BEIJING ZHIGU RUI TUO TECH CO., LTD., Beijing (CN)

(72) Inventors: Hanning Zhou, Beijing (CN); Jia Liu, Beijing (CN)

(73) Assignee: BEIJING ZHIGUGUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/536,903

(22) PCT Filed: Nov. 20, 2015

(86) PCT No.: PCT/CN2015/095088
§ 371 (c)(1),
(2) Date: Jun. 16, 2017

(87) PCT Pub. No.: WO2016/095655
PCT Pub. Date: Jun. 23, 2016

(65) Prior Publication Data
US 2017/0345133 A1    Nov. 30, 2017

(30) Foreign Application Priority Data

Dec. 18, 2014 (CN) .......................... 2014 1 0798561

(51) Int. Cl.
| | |
|---|---|
| *G06K 9/00* | (2006.01) |
| *G06T 5/00* | (2006.01) |
| *G06T 5/10* | (2006.01) |
| *H04N 5/232* | (2006.01) |
| *G06T 7/529* | (2017.01) |
| *G06T 7/11* | (2017.01) |

(Continued)

(52) U.S. Cl.
CPC ................ *G06T 5/003* (2013.01); *G06T 5/10* (2013.01); *G06T 7/11* (2017.01); *G06T 7/168* (2017.01);

(Continued)

(58) Field of Classification Search
None
See application file for complete search history.

(56) References Cited

U.S. PATENT DOCUMENTS

| | | |
|---|---|---|
| 6,870,965 B2 | 3/2005 | Kim et al. |
| 7,580,620 B2 | 8/2009 | Raskar et al. |

(Continued)

FOREIGN PATENT DOCUMENTS

| | | |
|---|---|---|
| CN | 1342300 A | 3/2002 |
| CN | 1426760 A | 7/2003 |

(Continued)

OTHER PUBLICATIONS

International Search Report and Written Opinion for Application No. PCT/CN2015/095088, dated Feb. 26, 2016, 7 pages.

(Continued)

*Primary Examiner* — Soo Jin Park
(74) *Attorney, Agent, or Firm* — Sheppard Mullin Richter & Hampton LLP

(57) ABSTRACT

Embodiments of the present application provide image processing methods and apparatus. A image processing method disclosed herein comprises: acquiring, from an image, two regions which have a textural similarity higher than a first value and have different depths; performing frequency-domain conversion on each of the regions, to obtain a frequency-domain signal of each region; and optimizing the image at least according to the frequency-domain signal of each region, the depth of each region and a focusing distance of the image.

19 Claims, 5 Drawing Sheets

(51) Int. Cl.
    *G06T 7/168*     (2017.01)
    *G06T 7/40*      (2017.01)
(52) U.S. Cl.
    CPC ............. *G06T 7/40* (2013.01); *G06T 7/529* (2017.01); *H04N 5/23254* (2013.01); *H04N 5/23267* (2013.01); *G06T 2207/10024* (2013.01); *G06T 2207/20056* (2013.01); *G06T 2207/20064* (2013.01); *G06T 2207/20201* (2013.01)

(56) References Cited

U.S. PATENT DOCUMENTS

2013/0307966 A1* 11/2013 Komatsu ............ G06T 7/0069
                                                382/106
2014/0009631 A1    1/2014 Topliss

FOREIGN PATENT DOCUMENTS

| CN | 101344913   | 1/2009 |
| CN | 101406041 A | 4/2009 |
| CN | 102436639 A | 5/2012 |

OTHER PUBLICATIONS

Levin et al., "Image and Depth from a Conventional Camera with a Coded Aperture," ACM Transactions on Graphics, Jul. 2007, vol. 26, No. 3, Article 70, 9 pages.

Krishnan, V., "Image and Depth from a Conventional Camera with a Coded Aperture," ACM Transactions on Graphics, Jul. 2007, Modified slides from author's website http://groups.csail.mit.edu/graphics/CodedAperture/.

* cited by examiner

IMAGE PROCESSING METHOD AND APPARATUS

CROSS-REFERENCE TO RELATED APPLICATIONS

This application is a National Phase Application of International Application No. PCT/CN2015/095088, filed on Nov. 20, 2015, which claims priority to and benefit of Chinese Patent Application No. 201410798561.0, filed on Dec. 18, 2014, and entitled "Image Processing Method and Apparatus", each of which is herein incorporated into the present application by reference in its entirety.

TECHNICAL FIELD

Embodiments of the present application generally relate to the field of image technologies, and in particular, to image processing methods and apparatus.

BACKGROUND

With popularity of portable cameras, users now demand higher requirements of imaging quality. However, due to the fact that a user usually holds the device by hand, image blurring may often be experienced which is caused by camera shake or unstable support, when using the portable cameras to take pictures.

The existing solutions may include estimating a trajectory of camera shake, and restoring a clearer image through deconvolution based on an image shot. There may be different methods for estimating the trajectory of camera shake, for example, an image-based method, a method based on a motion sensor of a camera, and the like.

SUMMARY

In view of this, one objective of embodiments of the present application is to provide an image processing solution.

To achieve the above objective, according to a first aspect, the embodiments of the present application provide an image processing method, comprising:

acquiring, from an image, two regions which have a textural similarity higher than a first value and have different depths;

performing frequency-domain conversion on each of the regions, to obtain a frequency-domain signal of each region; and optimizing the image at least according to the frequency-domain signal of each region, the depth of each region and a focusing distance of the image.

To achieve the above objective, according to a second aspect, the embodiments of the present application provide an image processing apparatus, comprising:

an image acquisition module, configured to acquire, from an image, two regions which have a textural similarity higher than a first value and have different depths;

a frequency-domain conversion module, configured to perform frequency-domain conversion on each of the regions, to obtain a frequency-domain signal of each region; and a first optimization module, configured to optimize the image at least according to the frequency-domain signal of each region, the depth of each region and a focusing distance of the image.

The above technical solutions may have the following beneficial effects:

The embodiments of the present application, by acquiring, from an image, two regions which have a textural similarity higher than a first value and have different depths, performing frequency-domain conversion on each of the regions, to obtain a frequency-domain signal of each region, and optimizing the image at least according to the frequency-domain signal of each region, the depth of each region and a focusing distance of the image, provide an image processing solution.

DETAILED DESCRIPTION

Specific implementations of the present application are further described below in detail with reference to the accompanying drawings and embodiments. The following embodiments are intended to describe the present application, but are not intended to limit the scope of the present application.

Figure 1:
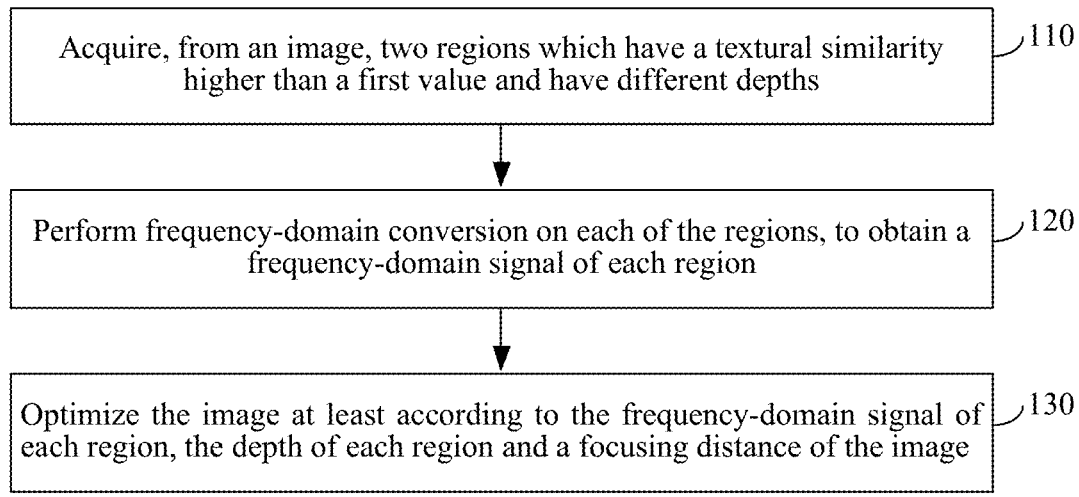
FIG. 1 is a schematic flowchart of Method Embodiment 1 of an image processing method according to the present application.

FIG. 1 is a schematic flowchart of an embodiment of an image processing method according to the present application. As shown in FIG. 1, this embodiment comprises:

110. Acquire, from an image, two regions which have a textural similarity higher than a first value and have different depths.

For example, an image processing apparatus in Apparatus Embodiment 1 or Apparatus Embodiment 2 of the present application serves as an execution body of this embodiment, and performs 110-130. Optionally, the image processing apparatus is disposed in a user terminal in a form of software and/or hardware. Optionally, the user terminal is a camera, or any user terminal comprising an image shooting apparatus, for example, a smartphone with a shooting function.

In this embodiment, the image is optionally formed through one shot.

In this embodiment, the first value may be a preset value, for example, the first value is 0.95.

In this embodiment, a depth of a region is related to depths of the objects in the region, and optionally, the depth of the region may be an average value of a maximum depth and a minimum depth of the objects in the region. The depth of each object is the distance between the object and a lens optical center of the image shooting apparatus.

In this embodiment, a maximum depth difference of the region does not exceed a preset threshold, for example, 1 meter. Specifically, the maximum depth difference of the region is a difference between a maximum depth and a minimum depth of the objects in the region.

Specifically, a depth of any point in the image may be determined in many ways, for example, by extracting main straight lines from the image, and obtaining straight lines actually in parallel through clustering; obtaining vanishing points of the whole image according to intersection points of the straight lines actually in parallel in the image; obtaining a direction of each straight line in a three-dimensional space according to the vanishing points; obtaining normal directions of corresponding planes according to directions of coplanar straight lines; obtaining more coplanar straight lines according to the normal directions of the planes, and iterating the process until normal directions of all planes are obtained; and determining a relative depth of each coplanar point according to normal directions of points on the planes; in order to obtain an absolute depth of each point, a machine learning method can be used, in which a classifier based on a Markov Random Field is pre-trained according to image characteristics, and obtaining a size of a certain object in the image according to the classifier, so as to obtain the absolute depth of each point in combination with the relative depth.

120. Perform frequency-domain conversion on each of the regions, to obtain a frequency-domain signal of each region.

In this embodiment, any region in the image can be represented with at least one space-domain signal of the region. The space-domain signal may include, but not limited to, any one of the following: a grey scale signal, a red (R) signal, a green (G) signal, and a blue (B) signal.

Optionally, the acquiring, from an image, two regions which have a textural similarity higher than a first value and have different depths comprises: acquiring, from an all-space-domain signal of an image, a space-domain signal of each region; and the performing frequency-domain conversion on each of the regions, to obtain a frequency-domain signal of each region comprises: performing frequency-domain conversion on the space-domain signal of each region, to obtain a frequency-domain signal of each region.

For example, the two regions comprise a region A and a region B, in 110, an R signal of the region A and an R signal of the region B are acquired from an R signal of the image, and in 120, frequency-domain conversion is performed respectively on the R signal of the region A and the R signal of the region B, to obtain a frequency-domain signal of the region A and a frequency-domain signal of the region B.

Specifically, as the image is generally two-dimensional, the space-domain signal of the image is also two-dimensional, that is, an independent variable space of the space-domain signal of the image is a two-dimensional space, and correspondingly, independent variable spaces of space-domain signals of the regions are also two-dimensional spaces.

In this embodiment, the frequency-domain conversion may be performed in many manners, for example, Fourier Transform (FT), Wavelet Transform (WT) and so on.

130. Optimize the image at least according to the frequency-domain signal of each region, the depth of each region and a focusing distance of the image.

Figure 2:
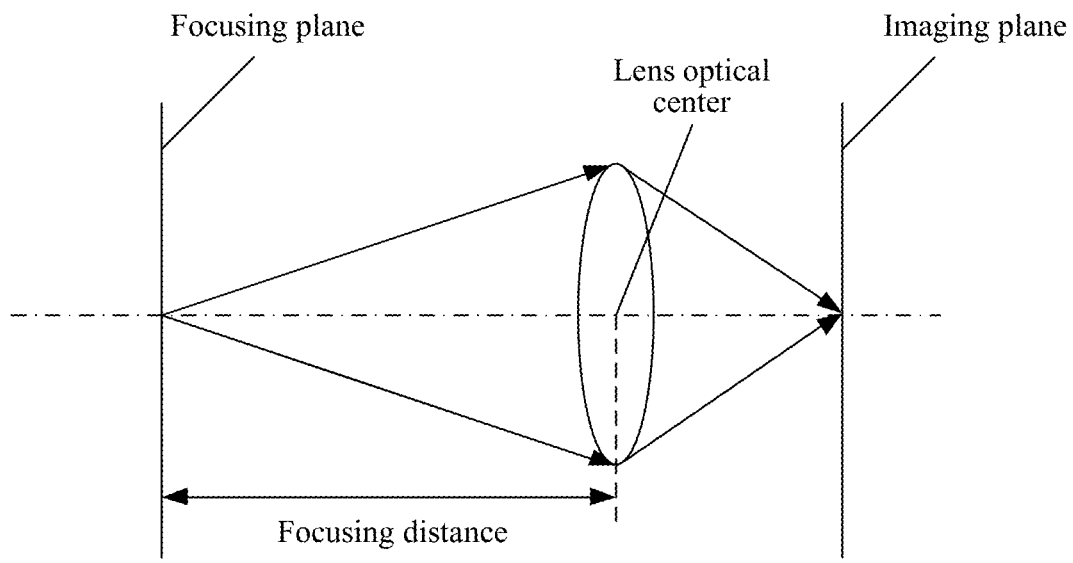
FIG. 2 is a schematic diagram of a focusing distance according to the present application.

In this embodiment, the focusing distance refers to a distance between a focusing plane and the lens optical center of the image shooting apparatus when the image shooting apparatus shoots the image. FIG. 2 is a schematic diagram of a focusing distance according to the present application. Specifically, the focusing distance is affected by a lens focal length and an image distance (that is, a distance between an imaging plane and a lens optical center). In a scene where the lens focal length is constant, generally, the focusing distance can be adjusted by adjusting the image distance; in a scene where the lens focal length is variable, the focusing distance can be adjusted by adjusting the image distance and/or the lens focal length.

In this embodiment, optimizing the image refers to increasing definition of at least one region in the image, specifically, decreasing blurring of the at least one region in the image caused by shake during shooting and possibility of being not within a depth of field range.

Similar to 110 and 120, the optimizing the image at least according to the frequency-domain signal of each region, the depth of each region and a focusing distance of the image comprises: obtaining at least one all-space-domain optimization signal of an optimized image at least according to the frequency-domain signal of each region, the depth of each region and the focusing distance of the image.

The all-space-domain optimization signal corresponds to the space-domain signal of each region. For example, the two regions comprise a region A and a region B, in 110, an R signal of the region A and an R signal of the region B are acquired from an R signal of the image, in 120, frequency-domain conversion is performed respectively on the R signal of the region A and the R signal of the region B, to obtain a frequency-domain signal of the region A and a frequency-domain signal of the region B, and in 130, an R signal of the optimized image is obtained at least according to a frequency-domain signal of the region A, a frequency-domain signal of the region B, depths of the regions and the focusing distance of the image.

During research, the inventor has found that, in an image formed through one shot, as affected by shake during shooting and possibility of being not within a depth of field range, at least one region in the image may be blurred, and for ease of description, an image obtained by shooting an actual scene corresponding to the image in an all-in-focus mode without shake is called the optimized image, space-domain signals of regions of the optimized image are called space-domain optimization signals of the regions, and frequency-domain signals of the regions of the optimized image are called frequency-domain optimization signals of the regions. Correspondingly, a space-domain signal of each region in the image is equivalent to a result of convolution of a corresponding space-domain optimization signal of the region and a Point Spread Function (PSF) (also called PSF of the region) relative to the region when an optical system of the image shooting apparatus shoots the image, wherein patterns of PSFs of the regions are generally the same, and a size of a PSF of each region is related to a distance between the region and the focusing plane of the image, that is, a difference between a depth of the region and the focusing distance of the image. Specifically, different differences between depths of the regions and the focusing distance determine scaling of the PSFs with the same pattern in an independent variable space. For example, the image comprises a region A and a region B, and if a ratio of an absolute value of a difference between a depth of the region A and the focusing distance of the image to an absolute value of a difference between a depth of the region B and the focusing distance of the image is 2, a PSF of the region A is equivalent to a result of enlarging a PSF of the region B in an independent variable space by a factor of the square of 2, that is, 4. Further, as convolution of space domain is equivalent to multiplication of frequency domain, a frequency-domain signal of each region in the image is equivalent to a product of a corresponding frequency-domain optimization signal of the region and an Optical Transfer Function (OTF) (also called OTF of the region) relative to the region when an optical system of the image shooting apparatus shoots the image, wherein OTF is a frequency-domain representation of PSF. Patterns of OTFs of the regions are generally the same, and a size of an OTF of each region is related to a distance between the region and the focusing plane of the image, that is, a difference between a depth of the region and the focusing distance of the image. Specifically, different differences between depths of the regions and the focusing distance determine scaling of the OTFs with the same pattern in an independent variable space, and the scaling of the OTFs and the scaling of the PSFs are reversed. For example, the image comprises a region A and a region B, and if a ratio of an absolute value of a difference between a depth of the region A and the focusing distance of the image to an absolute value of a difference between a depth of the region B and the focusing distance of the image is 2, an OTF of the region A is equivalent to a result of reducing an OTF of the region B to ¼ of it in a frequency space.

Based on the forgoing, if, in 110, a space-domain signal K1 of the region A and a space-domain signal K2 of the region B in an image are acquired, in 120, frequency-domain conversion is performed on K1 and K2, to obtain a frequency-domain signal W1 of the region A and a frequency-domain signal W2 of the region B, as a textural similarity between the region A and the region B is higher than the first value, it can be considered that a frequency-domain optimization signal of the region A is approximately the same as a frequency-domain optimization signal of the region B, which is set as I, suppose that OTFs of the region A and the region B are F1 and F2 respectively, then W1=I*F1, W2=I*F2, and F1=F2*$a^2$ are met, wherein a is a ratio of a difference between a depth of the region B and the focusing distance to a difference between a depth of the region A and the focusing distance, correspondingly, if W1, W2 and a are known, I, F1 and F2 can be obtained, and further, a space-domain optimization signal K1' of the region A and a space-domain optimization signal K2' of the region B can be obtained, so as to obtain an all-space-domain optimization signal of the optimized image.

This embodiment, by acquiring, from an image, two regions which have a textural similarity higher than a first value and have different depths, performing frequency-domain conversion on each of the regions, to obtain a frequency-domain signal of each region, and optimizing the image at least according to the frequency-domain signal of each region, the depth of each region and a focusing distance of the image, provides an image processing solution.

A method embodiment is further described below through some optional implementations.

In this embodiment, 130 has many manners of implementation.

In one optional implementation, the two regions comprise: a first region at a first depth and a second region at a second depth; and the obtaining at least one all-space-domain optimization signal of an optimized image at least according to the frequency-domain signal of each region, the depth of each region and the focusing distance of the image comprises:

obtaining a second value according to the first depth, the second depth and the focusing distance of the image, the second value being an absolute value of a ratio of a difference between the second depth and the focusing distance to a difference between the first depth and the focusing distance, and the second value being greater than 1;

obtaining a first space-domain optimization signal of the first region and a second space-domain optimization signal of the second region at least according to a first frequency-domain signal of the first region, a second frequency-domain signal of the second region and the second value; and obtaining the at least one all-space-domain optimization signal of the optimized image at least according to the first space-domain optimization signal of the first region and the second space-domain optimization signal of the second region.

The first depth may be different from the second depth.

Specifically, suppose that the focusing distance is L, the first depth is d1, the second depth is d2, and the second value m=|d1−L/d2−L|. As m>1, a first PSF of the first region is equivalent to a result of enlarging a second PSF of the second region in an independent variable space by a factor of $m^2$, and a first OTF of the first region is equivalent to a result of reducing a second OTF of the second region in a frequency space to $1/m^2$ of it.

It should be noted that, in this implementation, an absolute value of the difference between the first depth and the focusing distance is not equal to an absolute value of the difference between the second depth and the focusing distance, that is, distances respectively between the two regions and the focusing plane are different.

The obtaining a first space-domain optimization signal of the first region and a second space-domain optimization signal of the second region at least according to a first frequency-domain signal of the first region, a second frequency-domain signal of the second region and the second value has many manners of implementation.

Optionally, the obtaining a first space-domain optimization signal of the first region and a second space-domain optimization signal of the second region at least according to a first frequency-domain signal of the first region, a second frequency-domain signal of the second region and the second value comprises:

taking a part of a first spectrum region, which has the lowest frequency and an area of a third value, in the first frequency-domain signal of the first region as a part of the first spectrum region in a first optical transfer function OTF of the first region;

enlarging the part of the first spectrum region in the first OTF in a frequency space by a factor of the square of the second value, to obtain a part of a second spectrum region in a second OTF of the second region, an area of the second spectrum region being equal to a product of an area of the first spectrum region and the square of the second value;

performing local inversion on the second frequency-domain signal of the second region based on the part of the second spectrum region in the second OTF, to obtain a part of the second spectrum region in the second frequency-domain optimization signal of the second region;

taking the part of the second spectrum region in the second frequency-domain optimization signal of the second region as a part of the second spectrum region in the first frequency-domain optimization signal of the first region, and performing local inversion on the first frequency-domain signal based on the part of the second spectrum region in the first frequency-domain optimization signal of the first region, to obtain a part of the second spectrum region in the first OTF;

successively iterating the enlargement and the local inversion based on the part of the second spectrum region in the first OTF, to obtain the first OTF and the second OTF; and performing inversion on the first frequency-domain signal and the second frequency-domain signal respectively based on the first OTF and the second OTF, to obtain the first space-domain optimization signal of the first region and the second space-domain optimization signal of the second region.

The third value may be a preset value. As each region generally has a part where colors are relatively even, correspondingly, a lowest-frequency spectrum region of the first frequency-domain signal has a part where an amplitude is a constant, and correspondingly, the third value may be set with an aim to ensure that an amplitude of a part of the first spectrum region, which has the lowest frequency and has an area of the third value, in the frequency-domain signal is a constant. Further, the step of taking a part of a first spectrum region, which has the lowest frequency and an area of a third value, in a first frequency-domain signal of the first region as a part of the first spectrum region in a first OTF of the first region is equivalent to regarding an amplitude of a part of the first spectrum region in the first frequency-domain optimization signal as 1, which will not affect wave forms of the first frequency-domain optimization signal, the first OTF and the second OTF, but will affect amplitudes of the first frequency-domain optimization signal, the first OTF and the second OTF finally obtained, thereby resulting in that, compared with signals that may be obtained theoretically, wave forms of the first space-domain optimization signal and the second space-domain optimization signal obtained are the same but amplitudes are reduced or enlarged on the whole, and in order to solve the problem, it is feasible to reduce or enlarge, on the whole, the amplitude of the first space-domain optimization signal according to a proportional relation between a maximum amplitude of the obtained first space-domain optimization signal and a maximum amplitude of a corresponding space-domain signal of the first region, and to reduce or enlarge, on the whole, the amplitude of the second space-domain optimization signal according to a proportional relation between a maximum amplitude of the obtained second space-domain optimization signal and a maximum amplitude of a corresponding space-domain signal of the second region.

Optionally, independent variable spaces of space-domain signals of regions on which frequency-domain conversion is performed in 120 are rectangular coordinates spaces, and further optionally, the first spectrum region is a square region.

Optionally, the enlarging, in a frequency space, by a factor of the square of the second value refers to enlarging in the two dimensions in the frequency space by a factor of the second value. Correspondingly, if the first spectrum region is a square region, the second spectrum region is also a square region, and a side length of the second spectrum region is equal to a side length of the first spectrum region multiplied by the second value.

The taking the part of the second spectrum region in the second frequency-domain optimization signal of the second region as a part of the second spectrum region in the first frequency-domain optimization signal of the first region, in essence, considers that the first frequency-domain optimization signal and the second frequency-domain optimization signal are the same. As a textural similarity between the first region and the second region is higher, it is embodied in a frequency-domain space that high frequency parts of the first region and the second region are relatively approximate, that is, high spectrum regions of the first frequency-domain optimization signal and the second frequency-domain optimization signal may be relatively approximate, in addition, low high frequency parts in the frequency-domain space generally reflect colors, and a certain difference may exist between colors of the first region and the second region, thereby resulting in that a certain difference may exist between low spectrum regions of the first frequency-domain optimization signal and the second frequency-domain optimization signal, and in order to further enhance optimization effects, optionally, the obtaining a first space-domain optimization signal of the first region and a second space-domain optimization signal of the second region at least according to a first frequency-domain signal of the first region, a second frequency-domain signal of the second region and the second value comprises:

performing linear transformation on the first frequency-domain signal of the first region and/or the second frequency-domain signal of the second region, to obtain a first frequency-domain transformation signal and a second frequency-domain transformation signal with the same mean value;

taking a part of a third spectrum region, which has the lowest frequency and an area of a fourth value, in the first frequency-domain transformation signal as a part of the third spectrum region in a first OTF of the first region;

enlarging the part of the third spectrum region in the first OTF in a frequency space by a factor of the square of the second value, to obtain a part of a fourth spectrum region in a second OTF of the second image, an area of the fourth spectrum region being equal to a product of an area of the fourth spectrum region and the square of the second value;

performing local inversion on the second frequency-domain transformation signal based on the part of the fourth spectrum region in the first OTF, to obtain a part of the fourth spectrum region in a second optimized frequency-domain signal of the second region;

taking the part of the fourth spectrum region in the second frequency-domain optimization signal as a part of the fourth spectrum region in the first frequency-domain optimization signal of the first region, and performing local inversion on the first frequency-domain transformation signal based on the part of the fourth spectrum region in the first frequency-domain optimization signal, to obtain the part of the fourth spectrum region in the first OTF;

successively iterating the enlargement and the local inversion based on the part of the fourth spectrum region in the first OTF, to obtain the first OTF and the second OTF; and performing inversion on the first frequency-domain signal and the second frequency-domain signal respectively based on the first OTF and the second OTF, to obtain the first space-domain optimization signal of the first region and the second space-domain optimization signal of the second region.

The fourth value may be a preset value. As each region generally has a part where colors are relatively even, correspondingly, correspondingly, a lowest-frequency spectrum region of the first frequency-domain signal has a part where an amplitude is a constant, and correspondingly, the fourth value may be set with an aim to ensure that an amplitude of a part of the first spectrum region, which has the lowest frequency and has an area of the fourth value, in the frequency-domain signal is a constant. Further, the step of taking a part of a third spectrum region, which has the lowest frequency and an area of a fourth value, in the first frequency-domain transformation signal as a part of the third spectrum region in a first OTF of the first region is equivalent to regarding an amplitude of a part of the third spectrum region in the first frequency-domain optimization signal as 1, which will not affect wave forms of the first frequency-domain optimization signal, the first OTF and the second OTF, but will affect amplitudes of the first frequency-domain optimization signal, the first OTF and the second OTF finally obtained, thereby resulting in that, compared with signals that may be obtained theoretically, wave forms of the first space-domain optimization signal and the second space-domain optimization signal obtained are identical but amplitudes are reduced or enlarged on the whole, and in order to solve the problem, it is feasible to reduce or enlarge, on the whole, the amplitude of the first space-domain optimization signal according to a proportional relation between a maximum amplitude of the obtained first space-domain optimization signal and a maximum amplitude of a corresponding space-domain signal of the first region, and to reduce or enlarge, on the whole, the amplitude of the second space-domain optimization signal according to a proportional relation between a maximum amplitude of the obtained second space-domain optimization signal and a maximum amplitude of a corresponding space-domain signal of the second region.

Optionally, independent variable spaces of space-domain signals of regions on which frequency-domain conversion is performed in 120 are rectangular coordinates spaces, and further optionally, the third spectrum region is a square region.

Optionally, the enlarging, in a frequency space, by taking a factor of the square of the second value refers to enlarging in the two dimensions in the frequency space by a factor of the second value. Correspondingly, if the third spectrum region is a square region, the fourth spectrum region is also a square region, and a side length of the fourth spectrum region is equal to a side length of the third spectrum region multiplied by the second value.

In an optional implementation above, a part of a spectrum region in a signal or a function refers to a part in the signal or the function which belongs to the spectrum region. For example, the part of the first spectrum region in the first frequency-domain signal refers to a part in the first frequency-domain signal which belongs to the first spectrum region, and the part of the first OTF refers to a part in the first OTF which belongs to the first spectrum region.

In an optional implementation above, the first space-domain optimization signal of the first region and the second space-domain optimization signal of the second region obtained correspond to the space-domain signals of the regions on which frequency-domain conversion is performed in 120. For example, if the first frequency-domain signal and the second frequency-domain signal are obtained by performing frequency-domain conversion on R signals of the first region and the second region, the first space-domain optimization signal of the first region and the second space-domain optimization signal of the second region obtained are also R signals.

The obtaining the at least one all-space-domain optimization signal of the optimized image at least according to the first space-domain optimization signal of the first region and the second space-domain optimization signal of the second region may be implemented in many ways.

Optionally, the obtaining the at least one all-space-domain optimization signal of the optimized image at least according to the first space-domain optimization signal of the first region and the second space-domain optimization signal of the second region comprises:

replacing the space-domain signals of the first region and the second region in the all-space-domain signal of the image respectively with the first space-domain optimization signal of the first region and the second space-domain optimization signal of the second region, to obtain a first all-space-domain optimization signal.

That is to say, the first region and the second region in the image are optimized.

Optionally, the obtaining the at least one all-space-domain optimization signal of the optimized image at least according to the first space-domain optimization signal of the first region and the second space-domain optimization signal of the second region comprises:

obtaining at least one third OTF of at least one third region in the image other than the first region and the second region at least according to the first depth of the first region, the first OTF, at least one depth of the at least one third region and the focusing distance;

performing inversion on a third frequency-domain signal of each third region based on the third OTF of the third region, to obtain a third frequency-domain optimization signal of each third region;

performing space-domain conversion on a third optimized frequency-domain signal of each third region, to obtain a third space-domain optimization signal of each third region; and obtaining a second all-space-domain optimization signal according to the first space-domain optimization signal of the first region, the second space-domain optimization signal of the second region and the third space-domain optimization signal of each third region.

The third frequency-domain signal of each third region can be obtained in a manner of performing frequency-domain conversion on a space-domain signal of the third region.

Specifically, in the same optical system, differences of OTFs of different regions in the same image are related to differences between depths of the corresponding regions and the focusing distance of the image. For example, the focusing distance of the image is L, the depth of the first region is d1, the at least one third region comprises a region A and a region B, and depths of the region A and the region B are da and db respectively; if $|da-L/d1-L|>1$, a PSF of the region A is equivalent to a result of enlarging a first PSF of the first region in an independent variable space by a factor of $|da-L/d1-L|^2$, and an OTF of the region A is equivalent to a result of reducing a first OTF of the first region to $|d1-L/da-L|^2$ in a frequency space; if $|db-L/d1-L|<1$, a PSF of the region B is equivalent to a result of reducing the first PSF of the first region to $|d1-L/db-L|^2$ in the independent variable space, and an OTF of the region B is equivalent to a result of enlarging the first OTF of the first region in the frequency space by a factor of $|db-L/d1-L|^2$.

Specifically, the first region, the second region and the at least one third region cover all regions of the image.

It should be noted that, how the second all-space-domain optimization signal is obtained is described in the process by taking the first OTF of the first region as an example, and those skilled in the art can understand that the same purpose may also be achieved by replacing the first region with the second region and replacing the first OTF of the first region with the second OTF of the second region, to obtain the second all-space-domain optimization signal.

In this implementation, in order to further obtain at least one other all-space-domain optimization signal of the optimized image, for example, a G signal and a B signal of the optimized image are obtained after an R signal of the optimized image is obtained, optionally, this embodiment further comprises:

acquiring at least one other space-domain signal of the first region; performing frequency-domain conversion on the at least one other space-domain signal of the first region, to obtain at least one other frequency-domain signal of the first region; and obtaining at least one space-domain optimization signal of the first region according to the first OTF and the at least one other frequency-domain signal of the first region;

acquiring at least one other space-domain signal of the second region; performing frequency-domain conversion on the at least one other space-domain signal of the second region, to obtain at least one other frequency-domain signal of the second region; and obtaining at least one space-domain optimization signal of the second region according to the second OTF and the at least one other frequency-domain signal of the second region;

replacing the space-domain signals of the first region and the second region in the at least one other all-space-domain signal of the image respectively with the at least one other space-domain optimization signal of the first region and the at least one other space-domain optimization signal of the second region, to obtain at least one other first all-space-domain optimization signal; or acquiring at least one other space-domain signal of each third region; performing frequency-domain conversion on the at least one other space-domain signal of each third region, to obtain at least one other frequency-domain signal of each third region; obtaining at least one space-domain optimization signal of each third region according to the third OTF and the at least one other frequency-domain signal of each third region; and obtaining at least one other second all-space-domain signal according to the at least one space-domain optimization signal of the first region, the at least one space-domain optimization signal of the second region and the at least one space-domain optimization signal of each third region.

In this embodiment, 110 has many manners of implementation.

In one optional implementation, the acquiring, from an image, two regions which have a textural similarity higher than a first value and have different depths comprises:

dividing the image into at least two regions; and selecting, from the at least two regions, two regions which have a textural similarity higher than the first value and have different depths.

There are many manners of dividing the image into at least two regions, for example, a division method based on clustering, a division method based on color similarity, a division method based on object edges, a division method based on a Graph-cut algorithm and so on.

Figure 3A:
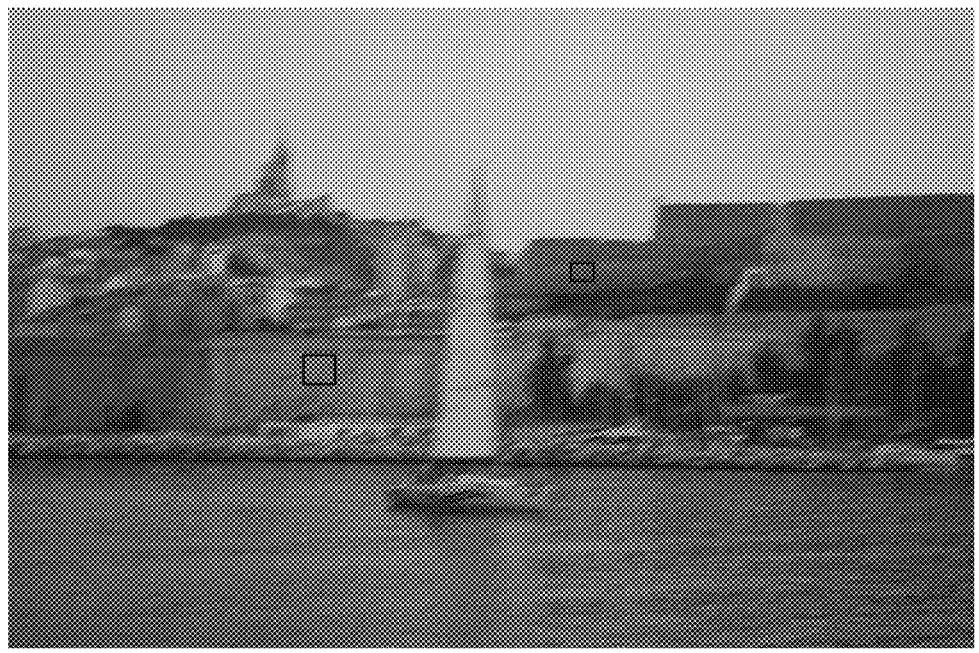
FIG. 3A is a schematic diagram of an image.
Figure 3B:
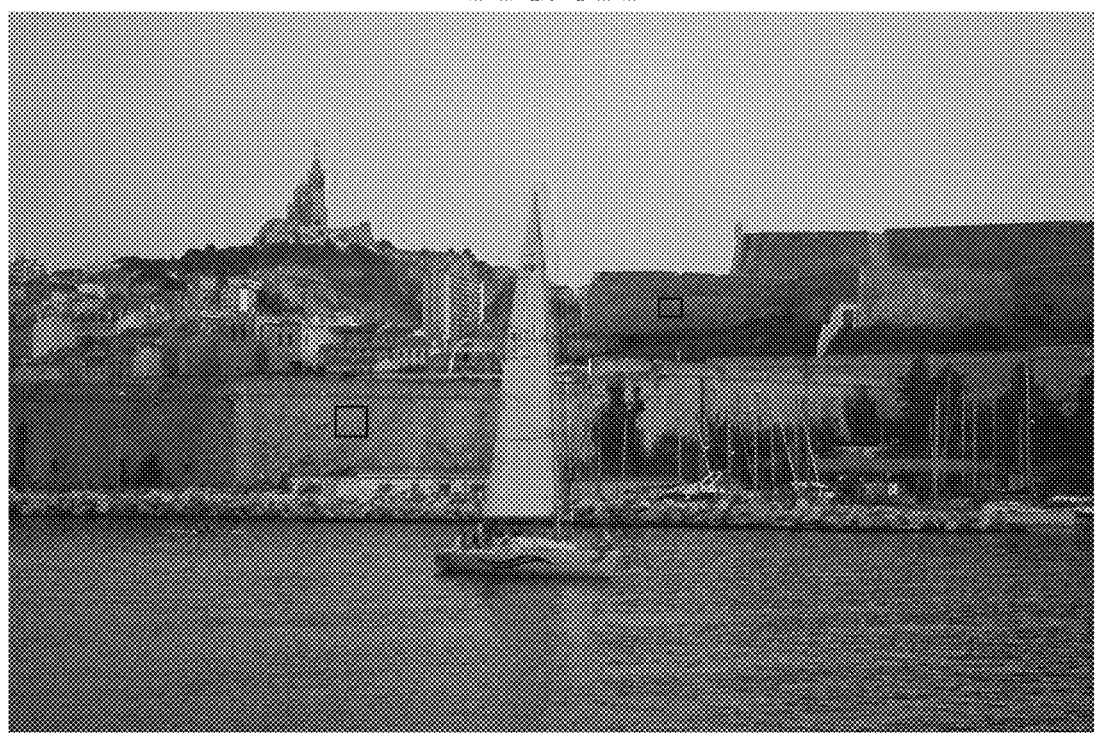
FIG. 3B is a schematic diagram of an optimized image obtained by using the method of this embodiment based on two regions in the image shown in FIG. 3A.

FIG. 3A is a schematic diagram of an image. As shown in FIG. 3A, two regions delineated by two black boxes are parts in two walls, the two walls are at different distances from a lens, and correspondingly, the two regions have a textural similarity higher than the first value and have different depths. FIG. 3B is a schematic diagram of an optimized image obtained by using the method of this embodiment based on two regions in the image shown in FIG. 3A.

Figure 4:
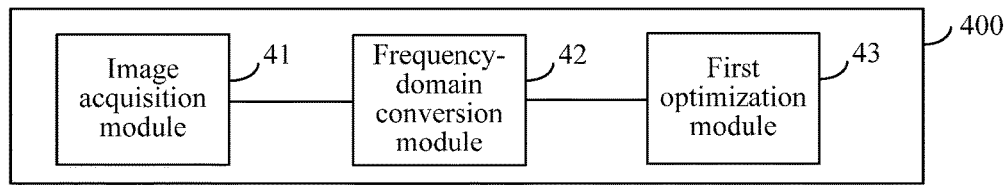
FIG. 4 is a schematic structural diagram of Apparatus Embodiment 1 of an image processing apparatus according to the present application.

FIG. 4 is a schematic structural diagram of Apparatus Embodiment 1 of an image processing apparatus according to the present application. As shown in FIG. 4, the image processing apparatus (hereinafter referred to as apparatus) 400 comprises:

an image acquisition module 41, configured to acquire, from an image, two regions which have a textural similarity higher than a first value and have different depths;

a frequency-domain conversion module 42, configured to perform frequency-domain conversion on each of the regions, to obtain a frequency-domain signal of each region; and a first optimization module 43, configured to optimize the image at least according to the frequency-domain signal of each region, the depth of each region and a focusing distance of the image.

In this embodiment, the image processing apparatus 400 is optionally disposed in a user terminal in a form of software and/or hardware. Optionally, the user terminal is a camera, or any user terminal comprising an image shooting component, for example, a smartphone with a shooting function.

In this embodiment, the image is optionally formed through one shot.

In this embodiment, the first value may be a preset value, for example, the first value is 0.95.

In this embodiment, a depth of a region is related to depths of the objects in the region, and optionally, the depth of the region may be an average value of a maximum depth and a minimum depth of the objects in the region. The depth of each object is the distance between the object and a lens optical center of the image shooting apparatus.

In this embodiment, a maximum depth difference of the region does not exceed a preset threshold, for example, 1 meter. Specifically, the maximum depth difference of the region is a difference between a maximum depth and a minimum depth of the objects in the region.

Specifically, a depth of any point in the image may be determined in many ways, for example, by extracting main straight lines from the image, and obtaining straight lines actually in parallel through clustering; obtaining vanishing points of the whole image according to intersection points of the straight lines actually in parallel in the image; obtaining a direction of each straight line in a three-dimensional space according to the vanishing points; obtaining normal directions of corresponding planes according to directions of coplanar straight lines; obtaining more coplanar straight lines according to the normal directions of the planes, and iterating the process until normal directions of all planes are obtained; and determining a relative depth of each coplanar point according to normal directions of points on the planes; in order to obtain an absolute depth of each point, a machine learning method can be used, in which a classifier based on a Markov Random Field is pre-trained according to image characteristics, and obtaining a size of a certain object in the image according to the classifier, so as to obtain the absolute depth of each point in combination with the relative depth.

In this embodiment, any region in the image can be represented with at least one space-domain signal of the region. The space-domain signal may include, but not limited to, any one of the following: a grey scale signal, a red (R) signal, a green (G) signal, and a blue (B) signal.

Optionally, the image acquisition module 41 is specifically configured to: acquire, from an all-space-domain signal of an image, a space-domain signal of each region;

the frequency-domain conversion module 42 is specifically configured to: perform performing frequency-domain conversion on the space-domain signal of each region, to obtain a frequency-domain signal of each region; and the first optimization module 43 is specifically configured to: obtain at least one all-space-domain optimization signal of the optimized image at least according to the frequency-domain signal of each region, the depth of each region and the focusing distance of the image.

For example, the two regions comprise a region A and a region B, the image acquisition module 41 acquires an R signal of the region A and an R signal of the region B from an R signal of the image, the frequency-domain conversion module 42 performs frequency-domain conversion respectively on the R signal of the region A and the R signal of the region B, to obtain a frequency-domain signal of the region A and a frequency-domain signal of the region B, and the first optimization module 43 obtains an R signal of the optimized image at least according to a frequency-domain signal of the region A, a frequency-domain signal of the region B, depths of the regions and the focusing distance of the image.

Specifically, as the image is generally two-dimensional, the space-domain signal of the image is also two-dimensional, that is, an independent variable space of the space-domain signal of the image is a two-dimensional space, and correspondingly, independent variable spaces of space-domain signals of the regions are also two-dimensional spaces.

In this embodiment, the frequency-domain conversion performed by the frequency-domain conversion module 42 may be performed many manners, for example, FT, WT and so on.

In this embodiment, the focusing distance refers to a distance between a focusing plane and the lens optical center of the image shooting apparatus when the image shooting apparatus shoots the image. FIG. 2 is a schematic diagram of a focusing distance according to the present application. Specifically, the focusing distance is affected by a lens focal length and an image distance (that is, a distance between an imaging plane and a lens optical center). In a scene where the lens focal length is constant, generally, the focusing distance can be adjusted by adjusting the image distance; in a scene where the lens focal length is variable, the focusing distance can be adjusted by adjusting the image distance and/or the lens focal length.

In this embodiment, the optimizing the image by the first optimization module 43 refers to increasing definition of at least one region in the image, specifically, decreasing blurring of the at least one region in the image caused by shake during shooting and possibility of being not within a depth of field range.

Optionally, the first optimization module 43 is specifically configured to: obtain at least one all-space-domain optimization signal of an optimized image at least according to the frequency-domain signal of each region, the depth of each region and the focusing distance of the image.

During research, the inventor has found that, in an image formed through one shot, as affected by shake during shooting and possibility of being not within a depth of field range, at least one region in the image may be blurred, and for ease of description, an image obtained by shooting an actual scene corresponding to the image in an all-in-focus mode without shake is called the optimized image, space-domain signals of regions of the optimized image are called space-domain optimization signals of the regions, and frequency-domain signals of the regions of the optimized image are called frequency-domain optimization signals of the regions. Correspondingly, a space-domain signal of each region in the image is equivalent to a result of convolution of a corresponding space-domain optimization signal of the region and a PSF (also called PSF of the region) relative to the region when an optical system of the image shooting apparatus shoots the image, wherein patterns of PSFs of the regions are generally the same, and a size of a PSF of each region is related to a distance between the region and the focusing plane of the image, that is, a difference between a depth of the region and the focusing distance of the image. Specifically, different differences between depths of the regions and the focusing distance determine scaling of the PSFs with the same pattern in an independent variable space. For example, the image comprises a region A and a region B, and if a ratio of an absolute value of a difference between a depth of the region A and the focusing distance of the image to an absolute value of a difference between a depth of the region B and the focusing distance of the image is 2, a PSF of the region A is equivalent to a result of enlarging a PSF of the region B in an independent variable space by a factor of the square of 2, that is, 4. Further, as convolution of space domain is equivalent to multiplication of frequency domain, a frequency-domain signal of each region in the image is equivalent to a product of a corresponding frequency-domain optimization signal of the region and an OTF (also called OTF of the region) relative to the region when an optical system of the image shooting apparatus shoots the image, wherein OTF is a frequency-domain representation of PSF. Patterns of OTFs of the regions are generally the same, and a size of an OTF of each region is related to a distance between the region and the focusing plane of the image, that is, a difference between a depth of the region and the focusing distance of the image. Specifically, different differences between depths of the regions and the focusing distance determine scaling of the OTFs with the same pattern in an independent variable space, and the scaling of the OTFs and the scaling of the PSFs are reversed. For example, the image comprises a region A and a region B, and if a ratio of an absolute value of a difference between a depth of the region A and the focusing distance of the image to an absolute value of a difference between a depth of the region B and the focusing distance of the image is 2, an OTF of the region A is equivalent to a result of reducing an OTF of the region B to ¼ of it in a frequency space.

Based on the above, if the image acquisition module 41 acquires a space-domain signal K1 of the region A and a space-domain signal K2 of the region B in an image, the frequency-domain conversion module 42 performs frequency-domain conversion on K1 and K2, to obtain a frequency-domain signal W1 of the region A and a frequency-domain signal W2 of the region B, as a textural similarity between the region A and the region B is higher than the first value, it can be considered that a frequency-domain optimization signal of the region A is approximately the same as a frequency-domain optimization signal of the region B, which is set as I, suppose that OTFs of the region A and the region B are F1 and F2 respectively, then $W1=I*F1$, $W2=I*F2$, and $F1=F2*a^2$ are met, wherein a is a ratio of a difference between a depth of the region B and the focusing distance to a difference between a depth of the region A and the focusing distance, correspondingly, if W1, W2 and a are known, the first optimization module 43 can obtain I, F1 and F2, and further, can obtain a space-domain optimization signal K1' of the region A and a space-domain optimization signal K2' of the region B, so as to obtain an all-space-domain optimization signal of the optimized image.

The image processing apparatus of this embodiment, by acquiring, by an image acquisition module, from an image, two regions which have a textural similarity higher than a first value and have different depths, performing, by a frequency-domain conversion module, frequency-domain conversion on each of the regions, to obtain a frequency-domain signal of each region, and optimizing, by a first optimization module, the image at least according to the frequency-domain signal of each region, the depth of each region and a focusing distance of the image, provides an image processing solution.

The image processing module 400 of this embodiment is further described below through some optional implementations.

In this embodiment, the first optimization module 43 has many manners of implementation.

Figure 5A:
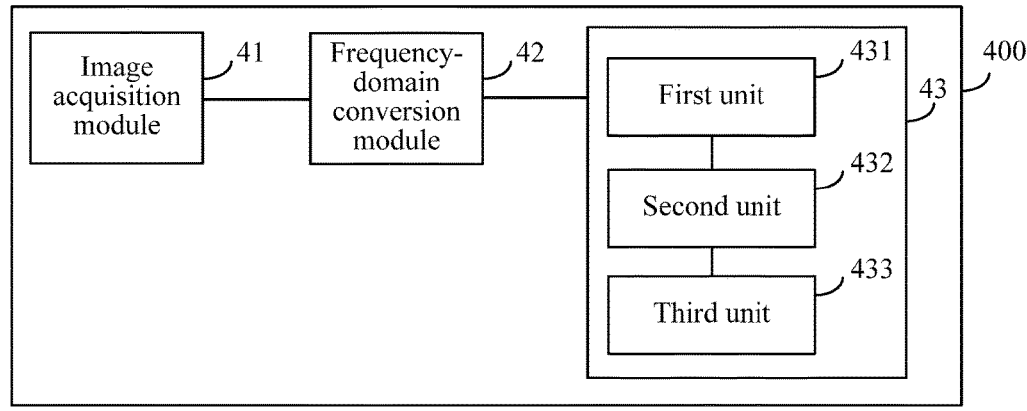
FIG. 5A to FIG. 5D are schematic structural diagrams of one implementation of the embodiment shown in FIG. 4.

In one optional implementation, the two regions comprise: a first region at a first depth and a second region at a second depth; and as shown in FIG. 5A, the first optimization module 43 comprises:

a first unit 431, configured to obtain a second value according to the first depth, the second depth and the focusing distance of the image, the second value being an absolute value of a ratio of a difference between the second depth and the focusing distance to a difference between the first depth and the focusing distance, and the second value being greater than 1;

a second unit 432, configured to obtain a first space-domain optimization signal of the first region and a second space-domain optimization signal of the second region at least according to a first frequency-domain signal of the first region, a second frequency-domain signal of the second region and the second value; and a third unit 433, configured to obtain the at least one all-space-domain optimization signal of the optimized image at least according to the first space-domain optimization signal of the first region and the second space-domain optimization signal of the second region.

The first depth may be different from the second depth.

Specifically, suppose that the focusing distance is L, the first depth is d1, the second depth is d2, and the second value $m=|d1-L/d2-L|$. As m>1, a first PSF of the first region is equivalent to a result of enlarging a second PSF of the second region in an independent variable space by a factor of $m^2$, and a first OTF of the first region is equivalent to a result of reducing a second OTF of the second region in a frequency space to $1/m^2$ of it.

It should be noted that, in the implementation, an absolute value of the difference between the first depth and the focusing distance is not equal to an absolute value of the difference between the second depth and the focusing distance, that is, distances respectively between the two regions and the focusing plane are different.

In the implementation, the second unit 432 has many manners implementation.

Figure 5B:
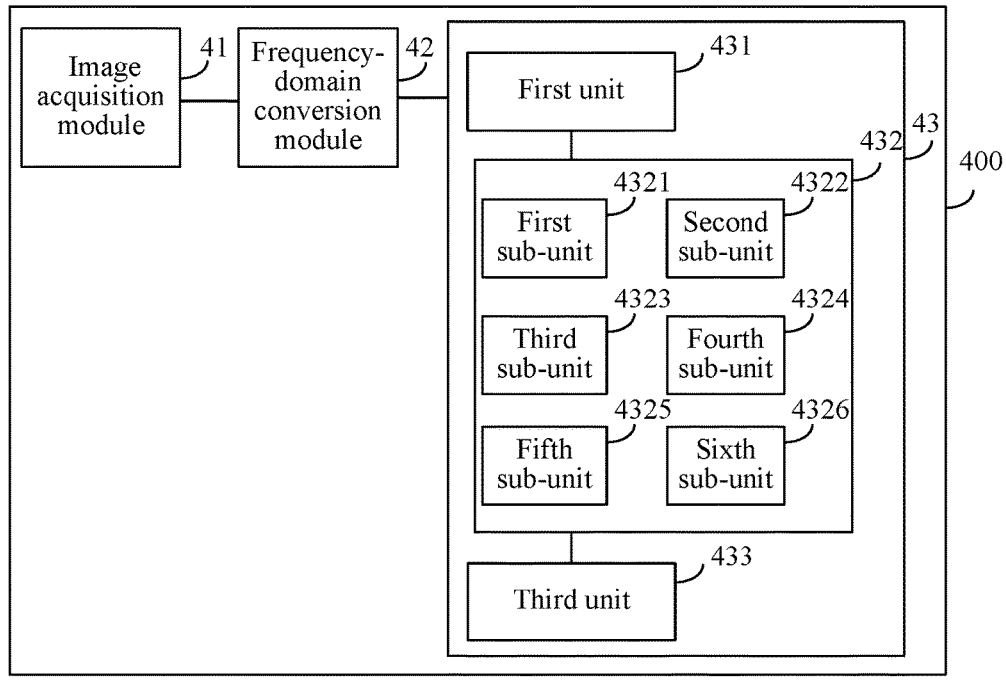

Optionally, as shown in FIG. 5B, the second unit 432 comprises:

a first sub-unit 4321, configured to take a part of a first spectrum region, which has the lowest frequency and an area of a third value, in the first frequency-domain signal of the first region as a part of the first spectrum region in a first optical transfer function OTF of the first region;

a second sub-unit 4322, configured to enlarge the part of the first spectrum region in the first OTF in a frequency space by a factor of the square of the second value, to obtain a part of a second spectrum region in a second OTF of the second region, an area of the second spectrum region being equal to a product of an area of the first spectrum region and the square of the second value;

a third sub-unit 4323, configured to perform local inversion on the second frequency-domain signal of the second region based on the part of the second spectrum region in the second OTF, to obtain a part of the second spectrum region in the second frequency-domain optimization signal of the second region;

a fourth sub-unit 4324, configured to take the part of the second spectrum region in the second frequency-domain optimization signal of the second region as a part of the second spectrum region in the first frequency-domain optimization signal of the first region, and perform local inversion on the first frequency-domain signal based on the part of the second spectrum region in the first frequency-domain optimization signal of the first region, to obtain a part of the second spectrum region in the first OTF;

a fifth sub-unit 4325, configured to successively iterate the enlargement and the local inversion based on the part of the second spectrum region in the first OTF, to obtain the first OTF and the second OTF; and a sixth sub-unit 4326, configured to perform inversion on the first frequency-domain signal and the second frequency-domain signal respectively based on the first OTF and the second OTF, to obtain the first space-domain optimization signal of the first region and the second space-domain optimization signal of the second region.

Reference can be specifically made to the corresponding description in the embodiments of the image processing method provided in the present application for the implementation of the second unit 432.

Figure 5C:
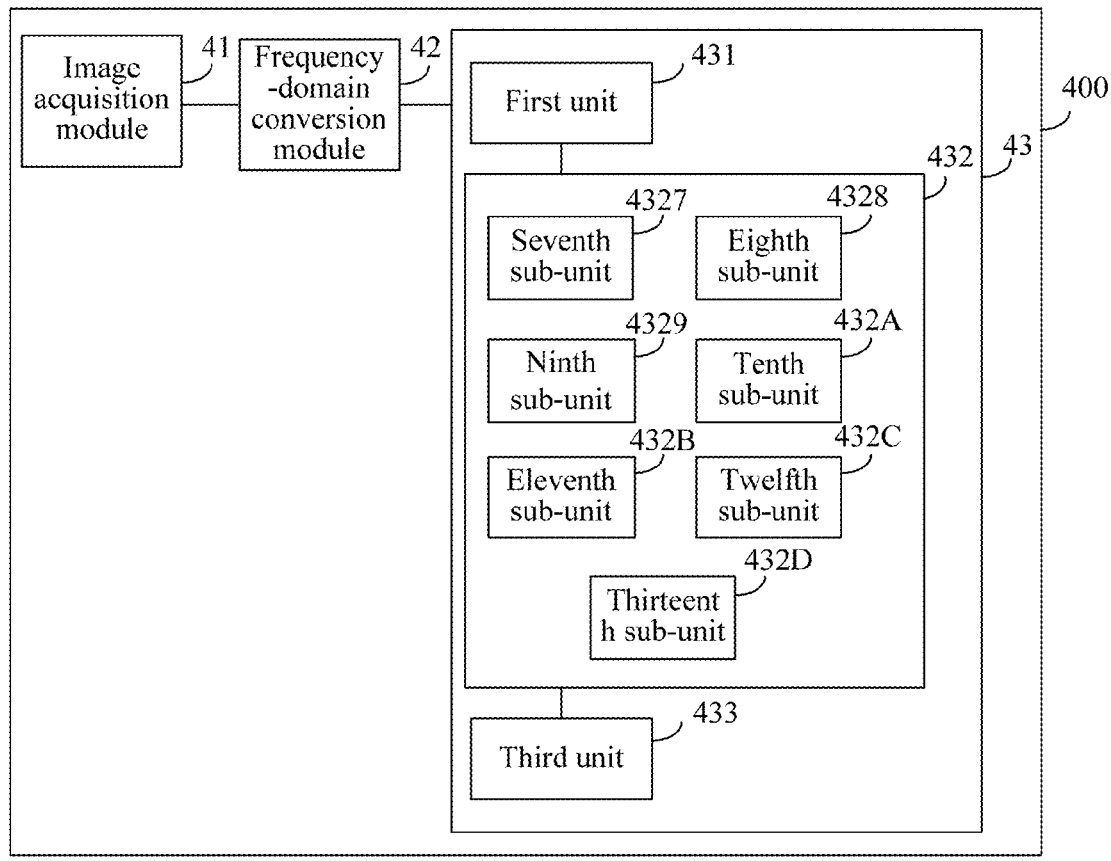

Optionally, as shown in FIG. 5C, the second unit 432 comprises:

a seventh sub-unit 4327, configured to perform linear transformation on the first frequency-domain signal of the first region and/or the second frequency-domain signal of the second region, to obtain a first frequency-domain transformation signal and a second frequency-domain transformation signal with the same mean value;

an eighth sub-unit 4328, configured to take a part of a third spectrum region, which has the lowest frequency and an area of a fourth value, in the first frequency-domain transformation signal as a part of the third spectrum region in a first OTF of the first region;

a ninth sub-unit 4329, configured to enlarge the part of the third spectrum region in the first OTF in a frequency space by a factor of the square of the second value, to obtain a part of a fourth spectrum region in a second OTF of the second image, an area of the fourth spectrum region being equal to a product of an area of the fourth spectrum region and the square of the second value;

a tenth sub-unit 432A, configured to perform local inversion on the second frequency-domain transformation signal based on the part of the fourth spectrum region in the first OTF, to obtain a part of the fourth spectrum region in a second optimized frequency-domain signal of the second region;

an eleventh sub-unit 432B, configured to take the part of the fourth spectrum region in the second frequency-domain optimization signal as a part of the fourth spectrum region in the first frequency-domain optimization signal of the first region, and perform local inversion on the first frequency-domain transformation signal based on the part of the fourth spectrum region in the first frequency-domain optimization signal, to obtain the part of the fourth spectrum region in the first OTF;

a twelfth sub-unit 432C, configured to successively iterate the enlargement and the local inversion based on the part of the fourth spectrum region in the first OTF, to obtain the first OTF and the second OTF; and a thirteenth sub-unit 432D, configured to perform inversion on the first frequency-domain signal and the second frequency-domain signal respectively based on the first OTF and the second OTF, to obtain the first space-domain optimization signal of the first region and the second space-domain optimization signal of the second region.

Reference can be specifically made to the corresponding description in the embodiments of the image processing method provided in the present application for the implementations of the second unit 432.

In the implementation, the third unit 433 has many manners of implementation.

Optionally, the third unit 433 is specifically configured to:

replace the space-domain signals of the first region and the second region in the all-space-domain signal of the image respectively with the first space-domain optimization signal of the first region and the second space-domain optimization signal of the second region, to obtain a first all-space-domain optimization signal.

Reference can be specifically made to the corresponding description in the embodiments of the image processing method provided in the present application for the implementation of the third unit 433.

Optionally, the third unit 433 is specifically configured to:

obtain at least one third OTF of at least one third region in the image other than the first region at least according to the first depth of the first region, the first OTF, at least one depth of the at least one third region and the second region and the focusing distance;

perform inversion on a third frequency-domain signal of each third region based on the third OTF of the third region, to obtain a third frequency-domain optimization signal of each third region;

perform space-domain conversion on a third optimized frequency-domain signal of each third region, to obtain a third space-domain optimization signal of each third region; and obtain a second all-space-domain optimization signal according to the first space-domain optimization signal of the first region, the second space-domain optimization signal of the second region and the third space-domain optimization signal of each third region.

Reference can be specifically made to the corresponding description in the embodiments of the image processing method provided in the present application for the implementation of the third unit 433.

In this implementation, in order to further obtain at least one other all-space-domain optimization signal of the optimized image, for example, the first optimization module 43 obtains a G signal and a B signal of the optimized image after obtaining an R signal of the optimized image, optionally, the apparatus 500 further comprises a second optimization module, the second optimization module being configured to:

acquire at least one other space-domain signal of the first region; performing frequency-domain conversion on the at least one other space-domain signal of the first region, to obtain at least one other frequency-domain signal of the first region; and obtain at least one space-domain optimization signal of the first region according to the first OTF and the at least one other frequency-domain signal of the first region;

acquire at least one other space-domain signal of the second region; perform frequency-domain conversion on the at least one other space-domain signal of the second region, to obtain at least one other frequency-domain signal of the second region; and obtain at least one space-domain optimization signal of the second region according to the second OTF and the at least one other frequency-domain signal of the second region;

replace the space-domain signals of the first region and the second region in the at least one other all-space-domain signal of the image respectively with the at least one other space-domain optimization signal of the first region and the at least one other space-domain optimization signal of the second region, to obtain at least one other first all-space-domain optimization signal; or acquire at least one other space-domain signal of each third region; perform frequency-domain conversion on the at least one other space-domain signal of each third region, to obtain at least one other frequency-domain signal of each third region; obtain at least one space-domain optimization signal of the third region according to the third OTF and the at least one other frequency-domain signal of each third region; and obtain at least one other second all-space-domain signal according to the at least one space-domain optimization signal of the first region, the at least one space-domain optimization signal of the second region and the at least one space-domain optimization signal of each third region.

In this embodiment, the image acquisition module 41 has many manners of implementation.

Figure 5D:
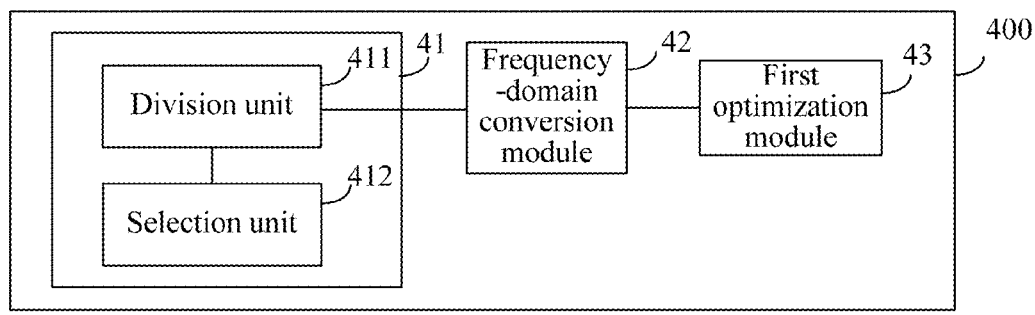

In one optional implementation, as shown in FIG. 5D, the image acquisition module 41 comprises:

a division unit 411, configured to divide the image into at least two regions; and a selection unit 412, configured to select, from the at least two regions, two regions which have a textural similarity higher than the first value and have different depths.

There are many manners of dividing, by the division unit 411, the image into at least two regions, for example, a division method based on clustering, a division method based on color similarity, a division method based on object edges, a division method based on a Graph-cut algorithm and so on.

Figure 6:
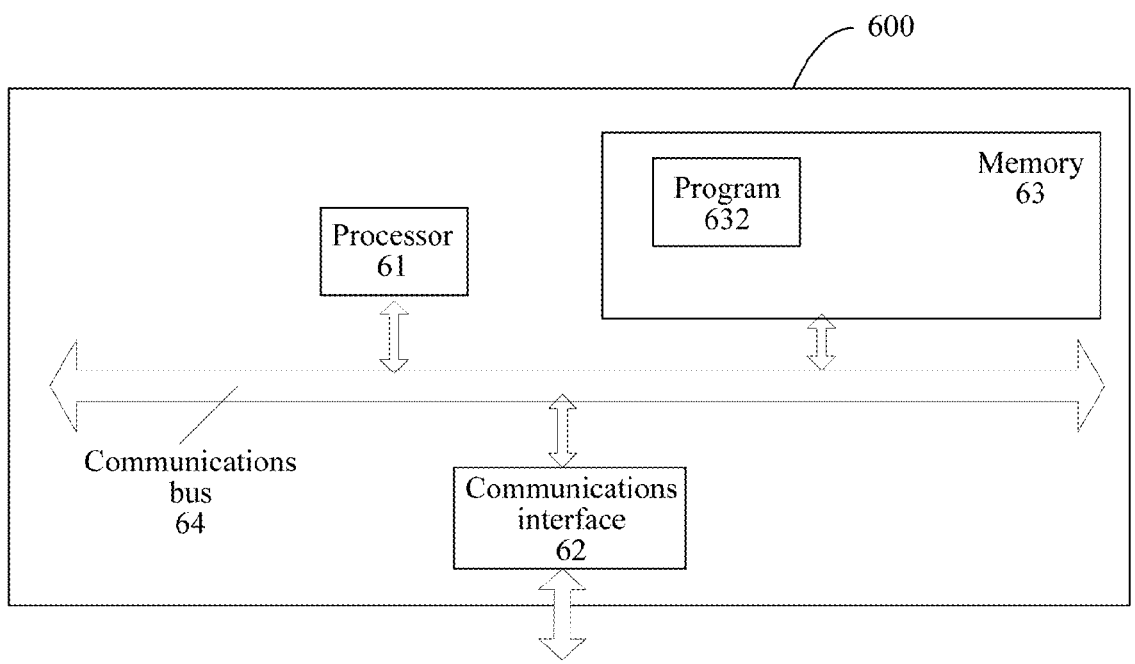
FIG. 6 is a schematic structural diagram of Apparatus Embodiment 2 of an image processing apparatus according to the present application.

FIG. 6 is a schematic structural diagram of Apparatus Embodiment 2 of an image processing apparatus according to the present application. As shown in FIG. 6, the image processing apparatus 600 comprises:

a processor 61, a Communications Interface 62, a memory 63, and a communications bus 64.

The processor 61, the Communications Interface 62, and the memory 63 accomplish mutual communications via the communications bus 64.

The Communications Interface 62 is configured to communicate with, for example, an image shooting apparatus and so on.

The processor 61 is configured to execute a program 632, and specifically, can implement relevant steps in the embodiments of the image processing method disclosed herein.

For example, the program 632 may comprise a program code, the program code comprising a computer operation instruction.

The processor 61 may be a central processing unit (CPU), or an application specific integrated circuit (ASIC), or be configured to be one or more integrated circuits which implement the embodiments of the image processing method.

The memory 63 is configured to store the program 632. The memory 63 may comprise a high-speed RAM memory, and may also comprise a non-volatile memory, for example, at least one magnetic disk memory. The program 632 may be specifically configured to enable the image processing apparatus 600 to execute the following steps:

acquiring, from an image, two regions which have a textural similarity higher than a first value and have different depths;

performing frequency-domain conversion on each of the regions, to obtain a frequency-domain signal of each region; and optimizing the image at least according to the frequency-domain signal of each region, the depth of each region and a focusing distance of the image.

Reference can be made to corresponding description in the corresponding steps and units in the embodiments of the image processing method for specific implementation of the steps in the program 632, which is not repeated herein.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can store program codes.

The above implementations are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. An image processing method, wherein the method comprises:
   acquiring, from an image, two regions which have a textural similarity higher than a first value and have different depths;
   performing frequency-domain conversion on each of the regions, to obtain a frequency-domain signal of each region; and
   optimizing the image at least according to the frequency-domain signal of each region, the depth of each region and a focusing distance of the image.

2. The method of claim 1, wherein the acquiring, from an image, two regions which have a textural similarity higher than a first value and have different depths comprises:
   acquiring, from an all-space-domain signal of an image, a space-domain signal of each region;
   the performing frequency-domain conversion on each of the regions, to obtain a frequency-domain signal of each region comprises:
   performing frequency-domain conversion on the space-domain signal of each region, to obtain a frequency-domain signal of each region; and
   the optimizing the image at least according to the frequency-domain signal of each region, the depth of each region and a focusing distance of the image comprises:
   obtaining at least one all-space-domain optimization signal of an optimized image at least according to the frequency-domain signal of each region, the depth of each region and the focusing distance of the image.

3. The method of claim 2, wherein the space-domain signal comprises at least one of the following: a grey scale signal, a red (R) signal, a green (G) signal, and a blue (B) signal.

4. The method of claim 2, wherein the two regions comprise: a first region at a first depth and a second region at a second depth; and
   the obtaining at least one all-space-domain optimization signal of an optimized image at least according to the frequency-domain signal of each region, the depth of each region and the focusing distance of the image comprises:
   obtaining a second value according to the first depth, the second depth and the focusing distance of the image, the second value being an absolute value of a ratio of a difference between the second depth and the focusing distance to a difference between the first depth and the focusing distance, and the second value being greater than 1;
   obtaining a first space-domain optimization signal of the first region and a second space-domain optimization signal of the second region at least according to a first frequency-domain signal of the first region, a second frequency-domain signal of the second region and the second value; and
   obtaining the at least one all-space-domain optimization signal of the optimized image at least according to the first space-domain optimization signal of the first region and the second space-domain optimization signal of the second region.

5. The method of claim 4, wherein the obtaining a first space-domain optimization signal of the first region and a second space-domain optimization signal of the second region at least according to a first frequency-domain signal of the first region, a second frequency-domain signal of the second region and the second value comprises:
   taking a part of a first spectrum region, which has the lowest frequency and an area of a third value, in the first frequency-domain signal of the first region as a part of the first spectrum region in a first optical transfer function OTF of the first region;
   enlarging the part of the first spectrum region in the first OTF in a frequency space by a factor of the square of the second value, to obtain a part of a second spectrum region in a second OTF of the second region, an area of the second spectrum region being equal to a product of an area of the first spectrum region and the square of the second value;
   performing local inversion on the second frequency-domain signal of the second region based on the part of the second spectrum region in the second OTF, to obtain a part of the second spectrum region in the second frequency-domain optimization signal of the second region;
   taking the part of the second spectrum region in the second frequency-domain optimization signal of the second region as a part of the second spectrum region in the first frequency-domain optimization signal of the first region, and performing local inversion on the first frequency-domain signal based on the part of the second spectrum region in the first frequency-domain optimization signal of the first region, to obtain a part of the second spectrum region in the first OTF;

successively iterating the enlargement and the local inversion based on the part of the second spectrum region in the first OTF, to obtain the first OTF and the second OTF; and performing inversion on the first frequency-domain signal and the second frequency-domain signal respectively based on the first OTF and the second OTF, to obtain the first space-domain optimization signal of the first region and the second space-domain optimization signal of the second region.

6. The method of claim 4, wherein the obtaining a first space-domain optimization signal of the first region and a second space-domain optimization signal of the second region at least according to a first frequency-domain signal of the first region, a second frequency-domain signal of the second region and the second value comprises:

performing linear transformation on the first frequency-domain signal of the first region and/or the second frequency-domain signal of the second region, to obtain a first frequency-domain transformation signal and a second frequency-domain transformation signal with the same mean value;

taking a part of a third spectrum region, which has the lowest frequency and an area of a fourth value, in the first frequency-domain transformation signal as a part of the third spectrum region in a first OTF of the first region;

enlarging the part of the third spectrum region in the first OTF in a frequency space by a factor of the square of the second value, to obtain a part of a fourth spectrum region in a second OTF of the second image, an area of the fourth spectrum region being equal to a product of an area of the fourth spectrum region and the square of the second value;

performing local inversion on the second frequency-domain transformation signal based on the part of the fourth spectrum region in the first OTF, to obtain a part of the fourth spectrum region in a second optimized frequency-domain signal of the second region;

taking the part of the fourth spectrum region in the second frequency-domain optimization signal as a part of the fourth spectrum region in the first frequency-domain optimization signal of the first region, and performing local inversion on the first frequency-domain transformation signal based on the part of the fourth spectrum region in the first frequency-domain optimization signal, to obtain the part of the fourth spectrum region in the first OTF;

successively iterating the enlargement and the local inversion based on the part of the fourth spectrum region in the first OTF, to obtain the first OTF and the second OTF; and performing inversion on the first frequency-domain signal and the second frequency-domain signal respectively based on the first OTF and the second OTF, to obtain the first space-domain optimization signal of the first region and the second space-domain optimization signal of the second region.

7. The method of claim 4, wherein the obtaining the at least one all-space-domain optimization signal of the optimized image at least according to the first space-domain optimization signal of the first region and the second space-domain optimization signal of the second region comprises:

replacing the space-domain signals of the first region and the second region in the all-space-domain signal of the image respectively with the first space-domain optimization signal of the first region and the second space-domain optimization signal of the second region, to obtain a first all-space-domain optimization signal.

8. The method of claim 4, wherein the obtaining the at least one all-space-domain optimization signal of the optimized image at least according to the first space-domain optimization signal of the first region and the second space-domain optimization signal of the second region comprises:

obtaining at least one third OTF of at least one third region in the image other than the first region and the second region at least according to the first depth of the first region, the first OTF, at least one depth of the at least one third region and the focusing distance;

performing inversion on a third frequency-domain signal of each third region based on the third OTF of the third region, to obtain a third frequency-domain optimization signal of each third region;

performing space-domain conversion on a third optimized frequency-domain signal of each third region, to obtain a third space-domain optimization signal of each third region; and obtaining a second all-space-domain optimization signal according to the first space-domain optimization signal of the first region, the second space-domain optimization signal of the second region and the third space-domain optimization signal of each third region.

9. The method of claim 1, wherein the acquiring, from an image, two regions which have a textural similarity higher than a first value and have different depths comprises:

dividing the image into at least two regions; and selecting, from the at least two regions, two regions which have a textural similarity higher than the first value and have different depths.

10. An image processing apparatus, wherein the apparatus comprises:

an image acquisition module, configured to acquire, from an image, two regions which have a textural similarity higher than a first value and have different depths;

a frequency-domain conversion module, configured to perform frequency-domain conversion on each of the regions, to obtain a frequency-domain signal of each region; and a first optimization module, configured to optimize the image at least according to the frequency-domain signal of each region, the depth of each region and a focusing distance of the image.

11. The apparatus of claim 10, wherein the image acquisition module is specifically configured to: acquire, from an all-space-domain signal of an image, a space-domain signal of each region;

the frequency-domain conversion module is specifically configured to: perform performing frequency-domain conversion on the space-domain signal of each region, to obtain a frequency-domain signal of each region; and the first optimization module is specifically configured to: obtain at least one all-space-domain optimization signal of an optimized image at least according to the frequency-domain signal of each region, the depth of each region and the focusing distance of the image.

12. The apparatus of claim 11, wherein the space-domain signal comprises at least one of the following: a grey scale signal, a red (R) signal, a green (G) signal, and a blue (B) signal.

13. The apparatus of claim 11, wherein the two regions comprise: a first region at a first depth and a second region at a second depth; and the first optimization module comprises:
a first unit, configured to obtain a second value according to the first depth, the second depth and the focusing distance of the image, the second value being an absolute value of a ratio of a difference between the second depth and the focusing distance to a difference between the first depth and the focusing distance, and the second value being greater than 1;
a second unit, configured to obtain a first space-domain optimization signal of the first region and a second space-domain optimization signal of the second region at least according to a first frequency-domain signal of the first region, a second frequency-domain signal of the second region and the second value; and
a third unit, configured to obtain the at least one all-space-domain optimization signal of the optimized image at least according to the first space-domain optimization signal of the first region and the second space-domain optimization signal of the second region.

14. The apparatus of claim 13, wherein the second unit comprises:
a first sub-unit, configured to take a part of a first spectrum region, which has the lowest frequency and an area of a third value, in the first frequency-domain signal of the first region as a part of the first spectrum region in a first optical transfer function OTF of the first region;
a second sub-unit, configured to enlarge the part of the first spectrum region in the first OTF in a frequency space by a factor of the square of the second value, to obtain a part of a second spectrum region in a second OTF of the second region, an area of the second spectrum region being equal to a product of an area of the first spectrum region and the square of the second value;
a third sub-unit, configured to perform local inversion on the second frequency-domain signal of the second region based on the part of the second spectrum region in the second OTF, to obtain a part of the second spectrum region in the second frequency-domain optimization signal of the second region;
a fourth sub-unit, configured to take the part of the second spectrum region in the second frequency-domain optimization signal of the second region as a part of the second spectrum region in the first frequency-domain optimization signal of the first region, and perform local inversion on the first frequency-domain signal based on the part of the second spectrum region in the first frequency-domain optimization signal of the first region, to obtain a part of the second spectrum region in the first OTF;
a fifth sub-unit, configured to successively iterate the enlargement and the local inversion based on the part of the second spectrum region in the first OTF, to obtain the first OTF and the second OTF; and
a sixth sub-unit, configured to perform inversion on the first frequency-domain signal and the second frequency-domain signal respectively based on the first OTF and the second OTF, to obtain the first space-domain optimization signal of the first region and the second space-domain optimization signal of the second region.

15. The apparatus of claim 13, wherein the second unit comprises:
a seventh sub-unit, configured to perform linear transformation on the first frequency-domain signal of the first region and/or the second frequency-domain signal of the second region, to obtain a first frequency-domain transformation signal and a second frequency-domain transformation signal with the same mean value;
an eighth sub-unit, configured to take a part of a third spectrum region, which has the lowest frequency and an area of a fourth value, in the first frequency-domain transformation signal as a part of the third spectrum region in a first OTF of the first region;
a ninth sub-unit, configured to enlarge the part of the third spectrum region in the first OTF in a frequency space by a factor of the square of the second value, to obtain a part of a fourth spectrum region in a second OTF of the second image, an area of the fourth spectrum region being equal to a product of an area of the fourth spectrum region and the square of the second value;
a tenth sub-unit, configured to perform local inversion on the second frequency-domain transformation signal based on the part of the fourth spectrum region in the first OTF, to obtain a part of the fourth spectrum region in a second optimized frequency-domain signal of the second region;
an eleventh sub-unit, configured to take the part of the fourth spectrum region in the second frequency-domain optimization signal as a part of the fourth spectrum region in the first frequency-domain optimization signal of the first region, and perform local inversion on the first frequency-domain transformation signal based on the part of the fourth spectrum region in the first frequency-domain optimization signal, to obtain the part of the fourth spectrum region in the first OTF;
a twelfth sub-unit, configured to successively iterate the enlargement and the local inversion based on the part of the fourth spectrum region in the first OTF, to obtain the first OTF and the second OTF; and
a thirteenth sub-unit, configured to perform inversion on the first frequency-domain signal and the second frequency-domain signal respectively based on the first OTF and the second OTF, to obtain the first space-domain optimization signal of the first region and the second space-domain optimization signal of the second region.

16. The apparatus of claim 13, wherein the third unit is specifically configured to:
replace the space-domain signals of the first region and the second region in the all-space-domain signal of the image respectively with the first space-domain optimization signal of the first region and the second space-domain optimization signal of the second region, to obtain a first all-space-domain optimization signal.

17. The apparatus of claim 13, wherein the third unit is specifically configured to:
obtain at least one third OTF of at least one third region in the image other than the first region at least according to the first depth of the first region, the first OTF, at least one depth of the at least one third region and the second region and the focusing distance;
perform inversion on a third frequency-domain signal of each third region based on the third OTF of the third region, to obtain a third frequency-domain optimization signal of each third region;
perform space-domain conversion on a third optimized frequency-domain signal of each third region, to obtain a third space-domain optimization signal of each third region; and
obtain a second all-space-domain optimization signal according to the first space-domain optimization signal of the first region, the second space-domain optimization signal of the second region and the third space-domain optimization signal of each third region.

18. The apparatus of claim 10, wherein the image acquisition module comprises:
   a division unit, configured to divide the image into at least two regions; and
   a selection unit, configured to select, from the at least two regions, two regions which have a textural similarity higher than the first value and have different depths.

19. A non-transitory computer-readable medium comprising executable instructions that, in response to execution, cause a device comprising a processor to perform operations, comprising:
   acquiring, from an image, two regions which have a textural similarity higher than a first value and have different depths;
   performing frequency-domain conversion on each of the regions, to obtain a frequency-domain signal of each region; and
   optimizing the image at least according to the frequency-domain signal of each region, the depth of each region and a focusing distance of the image.

* * * * *

UNITED STATES PATENT AND TRADEMARK OFFICE
CERTIFICATE OF CORRECTION

PATENT NO. : 10,325,357 B2  
APPLICATION NO. : 15/536903  
DATED : June 18, 2019  
INVENTOR(S) : Hanning Zhou et al.

Page 1 of 1

It is certified that error appears in the above-identified patent and that said Letters Patent is hereby corrected as shown below:

On the Title Page

Assignee, item (73):
"BEIJING ZHIGUGUI TUO TECH CO., LTD." should read -- BEIJING ZHIGU RUI TUO TECH CO., LTD. --.

Signed and Sealed this
Twentieth Day of August, 2019

Andrei Iancu
*Director of the United States Patent and Trademark Office*